US012074375B2

(12) United States Patent
Jiang et al.

(10) Patent No.: US 12,074,375 B2
(45) Date of Patent: Aug. 27, 2024

(54) MILLIMETER-WAVE DUAL CIRCULARLY POLARIZED LENS ANTENNA AND ELECTRONIC EQUIPMENT

(71) Applicants: SOUTHEAST UNIVERSITY, Jiangsu (CN); PURPLE MOUNTAIN LABORATORIES, Jiangsu (CN)

(72) Inventors: Zhihao Jiang, Jiangsu (CN); Wei Hong, Jiangsu (CN)

(73) Assignees: SOUTHEAST UNIVERSITY, Jiangsu (CN); PURPLE MOUNTAIN LABORATORIES, Jiangsu (CN)

( * ) Notice: Subject to any disclaimer, the term of this patent is extended or adjusted under 35 U.S.C. 154(b) by 275 days.

(21) Appl. No.: 17/775,896

(22) PCT Filed: Feb. 8, 2021

(86) PCT No.: PCT/CN2021/076024

§ 371 (c)(1),
(2) Date: May 11, 2022

(87) PCT Pub. No.: WO2022/027950

PCT Pub. Date: Feb. 10, 2022

(65) Prior Publication Data

US 2022/0399653 A1 Dec. 15, 2022

(30) Foreign Application Priority Data

Jan. 28, 2021 (CN) ......................... 202110115595.5

(51) Int. Cl.
*H01Q 21/24* (2006.01)
*H01Q 9/04* (2006.01)
*H01Q 19/06* (2006.01)

(52) U.S. Cl.
CPC .......... *H01Q 21/24* (2013.01); *H01Q 9/0414* (2013.01); *H01Q 19/06* (2013.01)

(58) Field of Classification Search
CPC .......... H01Q 21/0006; H01Q 21/0031; H01Q 21/24; H01Q 21/245; H01Q 9/04;
(Continued)

(56) References Cited

U.S. PATENT DOCUMENTS 6,219,002 B1 * 4/2001 Lim ......................... H01Q 1/40 343/769
7,898,480 B2 * 3/2011 Ebling ..................... H01Q 3/30 343/810
(Continued)

FOREIGN PATENT DOCUMENTS

CN 108173005 6/2018
CN 109742556 5/2019
(Continued)

OTHER PUBLICATIONS

"International Search Report (Form PCT/ISA/210) of PCT/CN2021/076024," mailed on Oct. 19, 2021, pp. 1-4.
(Continued)

*Primary Examiner* — Jason M Crawford
(74) *Attorney, Agent, or Firm* — JCIPRNET

(57) ABSTRACT

The present invention discloses a millimeter-wave dual circularly polarized lens antenna and electronic equipment. The antenna includes a broadband circularly polarized planar feed source array and a dual circularly polarized planar lens. In the planar feed source array, a double-layer stacked patch is used at the same time to achieve broadband circular polarization, and a sequentially rotating feed structure is used to further expand the bandwidth. In the planar lens, a miniaturized stacked patch and a microstrip true-time-delayed phase-shifting structure are used to obtain the independent regulation and control of the left-handed and right-handed circularly polarized wave transmissive phases in a relatively wide frequency band. The lens antenna of the present invention achieves dual circularly polarized highly
(Continued)

directional beam, and independently control the beam pointing of the left-handed circularly polarized wave and right-handed circularly polarized wave, and achieve the transmissive dual circularly polarized beam shaping.

18 Claims, 6 Drawing Sheets

(58) Field of Classification Search
CPC .... H01Q 9/0407; H01Q 9/0414; H01Q 19/06; H01Q 19/062; H01Q 3/30; H01Q 3/34; H01Q 3/46; H01Q 15/02; H01Q 15/04
See application file for complete search history.

(56) References Cited

U.S. PATENT DOCUMENTS

| | | | | |
|---|---|---|---|---|
| 11,081,803 | B2 * | 8/2021 | Ko | H01Q 3/14 |
| 11,233,334 | B2 * | 1/2022 | Ko | H01Q 15/08 |
| 11,575,206 | B2 * | 2/2023 | Hu | H01Q 21/065 |
| 2009/0128413 | A1 * | 5/2009 | Crouch | H01Q 9/0407 343/700 MS |
| 2017/0117633 | A1 * | 4/2017 | Park | H01Q 9/0428 |
| 2017/0179596 | A1 * | 6/2017 | Diaz | H01Q 3/34 |
| 2019/0319365 | A1 * | 10/2019 | Kim | H01Q 21/065 |
| 2022/0399653 | A1 * | 12/2022 | Jiang | H01Q 21/24 |
| 2023/0378652 | A1 * | 11/2023 | Jiang | H01Q 21/065 |

FOREIGN PATENT DOCUMENTS

| | | |
|---|---|---|
| CN | 111525280 | 8/2020 |
| CN | 112072302 | 12/2020 |
| CN | 112952404 | 6/2021 |
| WO | 2017003374 | 1/2017 |

OTHER PUBLICATIONS

"Written Opinion of the International Searching Authority (Form PCT/ISA/237) of PCT/CN2021/076024," mailed on Oct. 19, 2021, pp. 1-5.

* cited by examiner

Replacement sheet

MILLIMETER-WAVE DUAL CIRCULARLY POLARIZED LENS ANTENNA AND ELECTRONIC EQUIPMENT

CROSS-REFERENCE TO RELATED APPLICATION

This application is a 371 of international application of PCT application serial no. PCT/CN2021/076024, filed on Feb. 8, 2021, which claims the priority benefit of China application no. 202110115595.5, filed on Jan. 28, 2021. The entirety of each of the above mentioned patent applications is hereby incorporated by reference herein and made a part of this specification.

TECHNICAL FIELD

The present invention belongs to the field of wireless communication system electron devices, and particularly relates to a millimeter-wave dual circularly polarized lens antenna and electronic equipment.

BACKGROUND ART

A lens antenna, as a transmissive electromagnetic wave radiating apparatus that can generate a far-field focused wave beam, is widely used in wireless communication and satellite communication systems. Unlike the traditional parabolic reflector antenna, the wave beam forming of the lens antenna does not depend on the wave path difference caused by the different propagation distances of electromagnetic waves, but is based on the transmissive phase shift provided by its sub-wavelength resonant or non-resonant units, so it has the advantages of handiness, low profile, being conformal, etc. In addition, it differs from a planar reflective array antenna in that the feed source of the lens antenna and the wave beam generated by the lens are respectively located on two sides of the lens, so that the feed source does not block the wave beam formed by the lens, thereby more easily achieving a wave beam with a high polarization purity and a low side lobe. However, lens antennas are more challenging to design than the reflective array because they require high transmission efficiency in addition to the required phase shift required to be generated by each unit. Most of the existing lens antennas use a dynamic phase or a rotational phase alone. Based on that, a variety of single linear polarization and single circularly polarized lens antennas have been developed, and a dual linearly polarized lens antenna constructed by an isotropic unit is used.

Currently, there is little research on dual circularly polarized lens antennas with independent wave beam direction control, although the frequency reuse of the circularly polarized wave provided by them has important potential applications in multiple communication fields. The currently existing independent wave-beam-shaping dual circularly polarized lens antenna needs two functional layers. The bottom layer is one dual linearly polarized lens, which can independently phase shift the horizontally polarized wave and the vertically polarized wave which are orthogonal to each other. The top layer is one circular polarizer, which converts the horizontally/vertically linearly polarized wave into left-handed/right-handed circularly polarized wave. Due to the use of two functional layers, the achieved dual circularly polarized lens has a thickness close to or even more than one wavelength, and the bandwidth is narrow. Both the 3 dB axial ratio bandwidth and the 3 dB gain bandwidth are less than 8%.

SUMMARY OF THE INVENTION

Technical objective: in view of the deficiencies, the present invention discloses a millimeter-wave dual circularly polarized lens antenna and electronic equipment. The lens antenna has the characteristics of dual-circular-polarization independent wave-beam-forming, broadband operation, small gain fluctuation, high circularly polarized purity, low profile, etc., and can efficiently achieve a broadband dual-circular-polarization high-gain directional wave beam pointing in different directions.

Technical solution: in order to achieve the above technical objective, the present invention adopts the following technical solution:

a millimeter-wave dual circularly polarized lens antenna, characterized by comprising a broadband circularly polarized planar feed source array and a dual circularly polarized planar lens arranged in parallel, wherein the broadband circularly polarized planar feed source array outputs or receives a signal through the dual circularly polarized planar lens, wherein the dual circularly polarized planar lens comprises a plurality of dual circularly polarized transmissive phase shift units arranged periodically, wherein each dual circularly polarized transmissive phase shift unit comprises a stacked metal patch with a grooved upper layer, a second metal floor provided with two circular slots, a stacked metal patch with a grooved lower layer, and two upper-layer microstrip lines and two lower-layer microstrip lines;

the stacked metal patch with a grooved upper layer faces the broadband circularly polarized planar feed source array, both the stacked metal patch with a grooved upper layer and the stacked metal patch with a grooved lower layer are of a double-layer metal patch stacked structure, and a lower layer of the stacked metal patch with a grooved upper layer and two upper-layer microstrip lines are in the same metal layer and are physically connected; an upper layer of the stacked metal patch with a grooved lower layer and two lower-layer microstrip lines are in the same metal layer and are physically connected;

outer ends of each upper-layer microstrip line and lower-layer microstrip line are provided with metal through-holes which are connected to each other and pass through a circular slot; the stacked metal patch with a grooved upper layer and the stacked metal patch with a grooved lower layer are connected by two upper-layer microstrip lines, two lower-layer microstrip lines, and two metal through-holes.

Preferably, each dual circularly polarized transmissive phase shift unit is a transmissive half wave plate, and one dielectric layer is provided between layers of the stacked metal patch with a grooved upper layer, the second metal floor, and the stacked metal patch with a grooved lower layer;

the stacked metal patch with a grooved upper layer and the stacked metal patch with a grooved lower layer are respectively provided with four rectangular grooves opening outwards in a direction of ±45°.

Preferably, a phase shift of any one of the two upper-layer microstrip lines of the dual circularly polarized transmissive phase shift unit is a quarter of a sum of the phase shifts of the left-handed circularly polarized wave and the right-handed circularly polarized wave required by a unit, and the phase shift of the other microstrip line is a quarter of the sum of phase shifts of the left-handed circularly polarized wave and the right-handed circularly polarized wave required by the unit plus or minus 90°, and an in-plane rotation angle of the dual circularly polarized transmissive phase shift unit is equal to a quarter of a difference between the phase shifts of the left-handed circularly polarized wave and the right-handed circularly polarized wave required by the unit; it is used to achieve independently controllable dual circularly polarized millimeter-wave beam.

Preferably, the in-plane rotation angle of each dual circularly polarized transmissive phase shift unit is 0°, the phase shifts of the two upper-layer microstrip lines of the dual circularly polarized transmissive phase shift unit are respectively one-half of the phase shifts of two linear polarizations required by the unit, and patterns and sizes of the two upper-layer microstrip lines and the two lower-layer microstrip lines are identical; it is used to achieve independently controllable dual linear polarization wave beam.

Preferably, the broadband circularly polarized planar feed source array comprises a plurality of feed source antenna units, wherein each feed source antenna unit comprises four slot-coupling circularly polarized antenna units which are arranged to rotate in sequence and one microstrip parallel feed circuit, and each slot-coupling circularly polarized antenna unit comprises a metal patch with an angle of chamfer at the upper layer, a metal patch with an angle of chamfer at the lower layer, and a first metal floor, an I-shaped coupling slot being provided on the first metal floor.

Preferably, angles of chamfer of the circular metal patch with an angle of chamfer at the upper layer and the circular metal patch with an angle of chamfer at the lower layer are −45° or +45°; the four slot-coupling circularly polarized antenna units are arranged to rotate in sequence, with rotation angles successively being 0°, 90°, 0°, and 90°;

the microstrip parallel feed circuit feeds four circularly polarized antenna units, and the microstrip parallel feed circuit comprises one input port and four output ports, wherein a characteristic impedance of the input port is 50 ohms, the characteristic impedance of the four output ports is 70 ohms, and output phases are successively 0°, 90°, 180°, 270° or 0°, −90°, −180°, −270°.

Preferably, the dual circularly polarized planar lens comprises a lens first-layer substrate, a lens second-layer substrate, a lens third-layer substrate, and a lens fourth-layer substrate; two layers of the stacked metal patch with a grooved upper layer are respectively attached to an upper surface and a lower surface of the lens first-layer substrate, the two layers of the stacked metal patch with a grooved lower layer are respectively attached to the upper surface and lower surface of the lens fourth-layer substrate, and the second metal floor is located between the lens second-layer substrate and the lens third-layer substrate.

Preferably, the broadband circularly polarized planar feed source array comprises a feed source upper layer substrate, a feed source middle layer substrate, and a feed source bottom layer substrate, wherein the metal patch with an angle of chamfer at the upper layer is attached on the lower surface of the feed source upper layer substrate, the metal patch with an angle of chamfer at the lower layer is attached on the upper surface of the feed source middle layer substrate, the microstrip parallel feed circuit is attached on the lower surface of the feed source bottom layer substrate, and a first metal floor is located between the feed source middle layer substrate and the feed source bottom layer substrate. between the feed source upper layer substrate and the feed source middle layer substrate is one air layer for controlling a coupling strength between the circular metal patch with an angle of chamfer at the upper layer and the circular metal patch with an angle of chamfer at the lower layer, and a thickness is less than 0.15 wavelength.

Preferably, the center of the broadband circularly polarized planar feed source array and the center of the dual circularly polarized planar lens are on the same line, a distance between the two is F, a diameter of the dual circularly polarized planar lens is D, and a value range of F/D is 0.3-1.5.

Electronic equipment is characterized by comprising a housing, wherein more than one aforementioned millimeter-wave dual circularly polarized lens antenna is provided in the housing.

Beneficial effects: with the above-mentioned technical solution, the broadband dual circularly polarized millimeter-wave planar lens antenna proposed by the present invention has the following advantages.

(1) Dual circular-polarization independent beam control can be achieved: by simultaneously using a dynamic phase and a rotational phase, the transmissive phases of the left-handed circularly polarized wave and the right-handed circularly polarized wave can be independently regulated and controlled by a single functional layer, wherein the dynamic phase is obtained by two microstrip transmission lines with different lengths connecting the upper-layer stacked metal patch and the lower-layer stacked metal patch, and the rotational phase is obtained by performing different in-plane rotations on each dual circularly polarized transmissive phase shift unit.

(2) It has a transmissive framework: unlike the reflective array, according to the present invention, the polarization purity and beam shape can be well controlled because the present invention achieves transmissive dual circularly polarized beam-forming and overcomes negative effects such as feed source blocking.

(3) It has broadband characteristics: this is because that a broadband circularly polarized planar feed source array and a broadband dual circularly polarized planar lens are used. In the planar feed source array, a double-layer stacked patch is used at the same time to achieve broadband circularly polarized, and a sequentially rotating feed structure is used to further expand the bandwidth and improve the polarization purity. In the planar lens, a miniaturized stacked patch and a microstrip true-time-delayed phase-shifting structure are used to obtain the independent adjustment and regulation of left-handed/right-handed circularly polarized wave transmissive phases in a relatively wide frequency band. Therefore, the left-handed and right-handed circularly polarized wave beams of high purity and pointing in different directions can be achieved in a bandwidth of more than 12%.

(4) It has the characteristics of handiness, high integration, low cost, etc.: this is because the planar lens has only one functional layer and uses a dielectric substrate with a sub-wavelength thickness, and the total thickness can be less than 0.11 wavelength, which is reduced to about 1/10 of the thickness of the existing dual circularly polarized lens using two functional layers.

BRIEF DESCRIPTION OF THE DRAWINGS

FIG. 4A represents the transmissive phase shift ($\phi(t_{LR})$) of the right-handed rotation incidence and left-handed rotation outgoing, and FIG. 4B represents the transmissive phase shift ($\phi(t_{RL})$) of the left-handed rotation incidence and right-handed rotation outgoing;

FIG. 5A represents the transmission amplitude ($T_{LR}$) of the right-handed rotation incidence and left-handed rotation outgoing, and FIG. 5B represents the transmission amplitude ($T_{RL}$) of the left-handed rotation incidence and right-handed rotation outgoing;

FIG. 6A represents a left-handed to right-handed circularly polarized phase shift distribution diagram ($\phi(t_{RL})$); FIG. 6B represents a right-handed to left-handed circularly polarized phase shift distribution diagram ($\phi(t_{LR})$); FIG. 6C represents a microstrip line length ($l_y$) distribution diagram of a dual circularly polarized transmissive phase shift unit; and FIG. 6D represents a rotation angle distribution diagram of the dual circularly polarized transmissive phase shift unit;

FIG. 7A represents the radiation pattern in the x-z plane, and FIG. 7B represents the radiation pattern in the y-z plane;

FIG. 8A represents the port reflection coefficient, and FIG. 8B represents the gain and axial ratio;

FIG. 9A represents the radiation pattern in the x-z plane, and FIG. 9B represents the radiation pattern in the y-z plane;

FIG. 10A the port reflection coefficient, and FIG. 10B the gain and axial ratio;

wherein, 1—broadband circularly polarized planar feed source array, 2—dual circularly polarized planar lens, and 3—dual circularly polarized transmissive phase shift unit;

1*a*—slot-coupling circularly polarized antenna unit, 1*b*—microstrip parallel feed circuit, 1*c*—circular metal patch with an angle of chamfer at the upper layer, 1*d*—circular metal patch with an angle of chamfer at the lower layer, 1*e*—first metal floor, 1*f*—feed source upper layer substrate, 1*g*—feed source middle layer substrate, and 1*h*—feed source bottom layer substrate;

3*a*—stacked metal patch with a grooved upper layer, 3*b*—circular slot, 3*c*—second metal floor, 3*d*—stacked metal patch with a grooved lower layer, 3*e*—upper-layer microstrip line, 3*f*—lower-layer microstrip line, 3*g*—metal through-hole, 3*h*—lens first-layer substrate, 3*i*—lens second-layer substrate, 3*j*—lens third-layer substrate, 3*k*—lens fourth-layer substrate, and 3*l*—rectangular groove.

DETAILED DESCRIPTION OF THE INVENTION

The present invention proposes a broadband dual circularly polarized millimeter-wave dual circularly polarized lens antenna. The structure is composed of one broadband circularly polarized planar antenna array and one dual circularly polarized planar lens. The broadband circularly polarized planar feed source array is composed of four slot-coupling circularly polarized antenna units which are arranged rotating in sequence and one microstrip parallel feed circuit, and the dual circularly polarized planar lens is composed of sub-wavelength dual circularly polarized transmissive phase shift units which are arranged periodically, and each unit comprises one stacked metal patch with a grooved upper layer, one metal floor with two circular slots excavated, and a stacked metal patch with a grooved lower layer. The stacked metal patch with a grooved upper layer and the stacked metal patch with a grooved lower layer are connected by two upper-layer microstrip lines and two lower-layer microstrip lines via two metal through-holes, and the lengths and rotation angles of the microstrip lines of each unit are different. The dual circularly polarized millimeter-wave dual circularly polarized lens antenna can achieve the independent wave beam forming of the left-handed and right-handed circularly polarized waves in one wide frequency band, its 1 dB gain and axial ratio <2 dB bandwidth is about 12%, and the lens profile is only 0.11 wavelength. Compared with the existing dual circularly polarized lens antennas, the present invention has the advantages of lower profile, wider axial ratio bandwidth, wider gain bandwidth, etc., and has broad application prospects in the fields of future fifth-generation mobile communication and satellite communication, etc.

The present invention will be described below in further detail with reference to the accompanying drawings.

Figure 1:
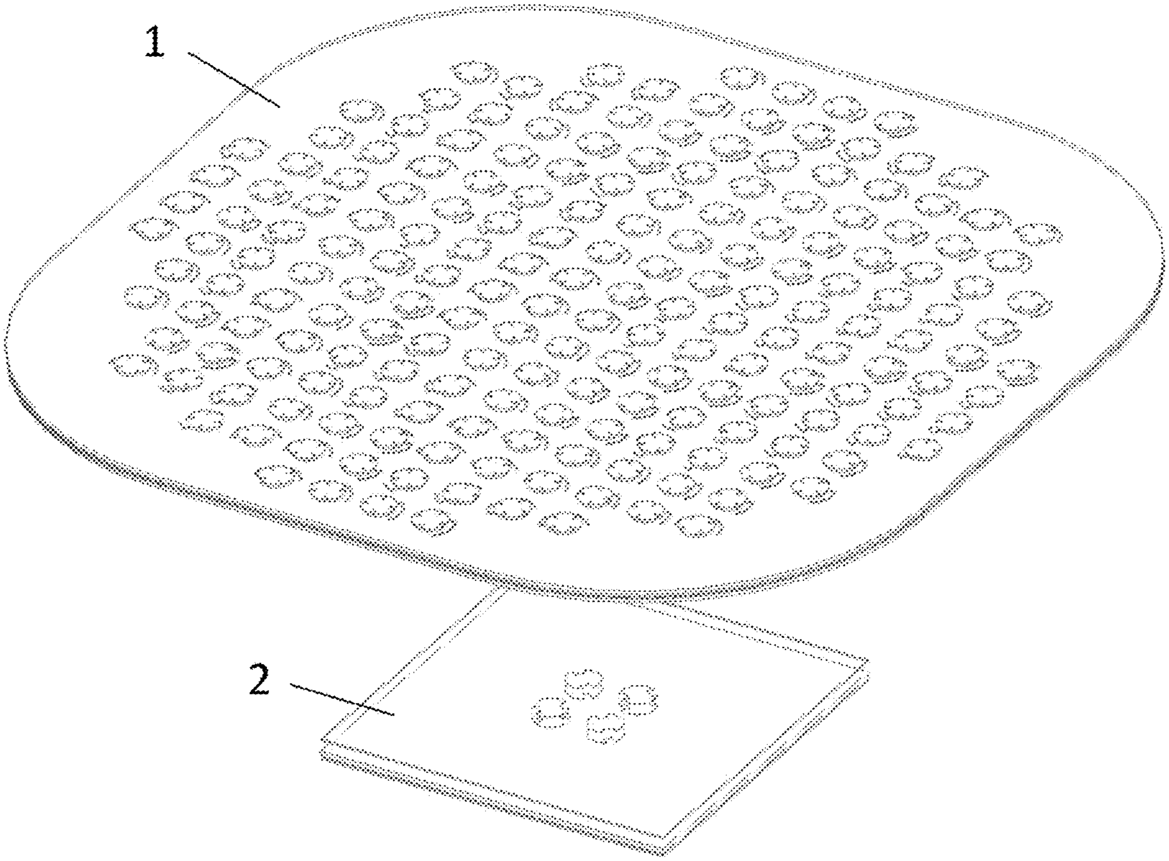
FIG. 1 shows a three-dimensional schematic view of a broadband dual circularly polarized millimeter-wave dual circularly polarized lens antenna of the present invention.
Figure 2:
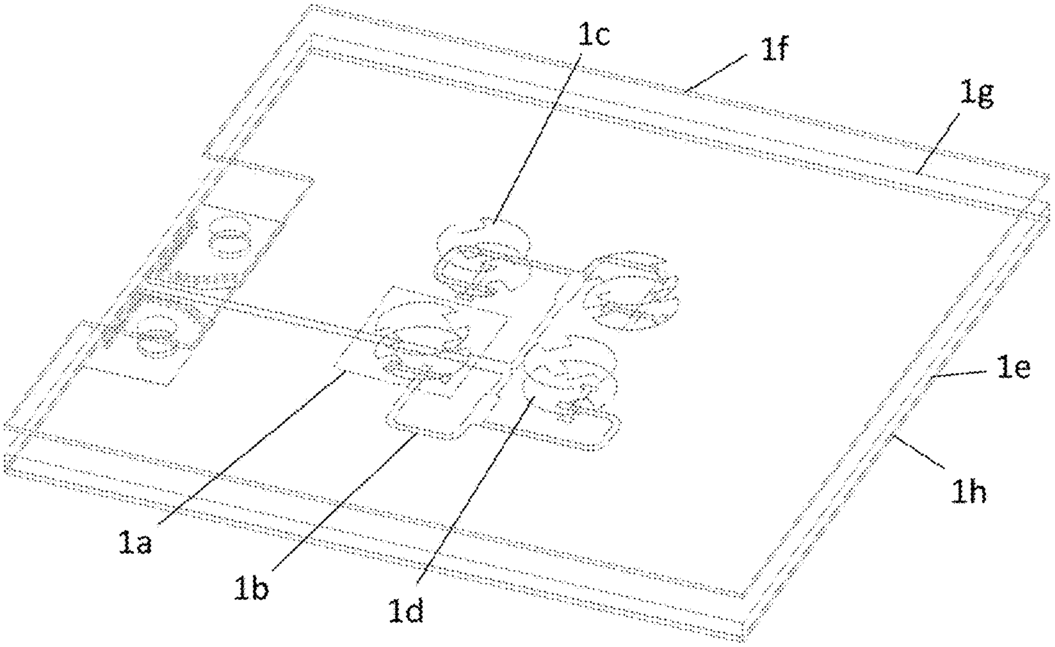
FIG. 2 shows a three-dimensional schematic view of a broadband circularly polarized planar feed source array.
Figure 3:
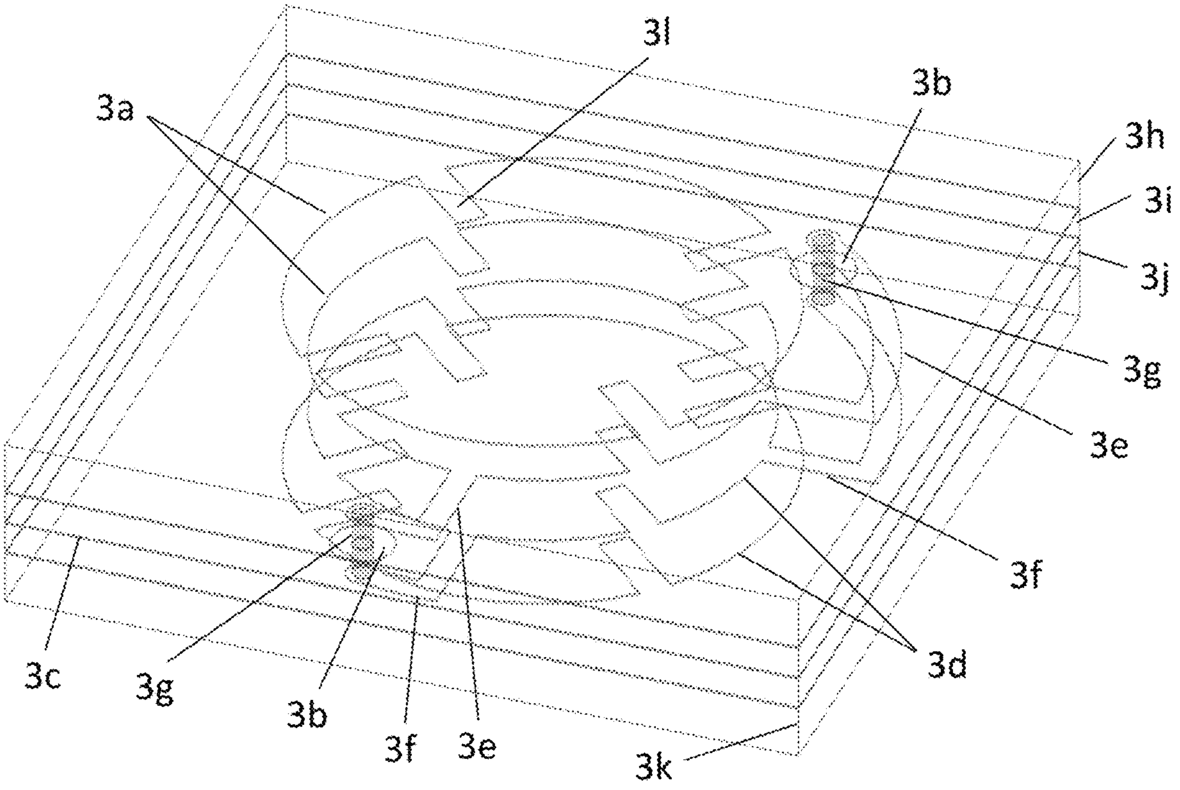
FIG. 3 is a three-dimensional schematic view of a dual circularly polarized transmissive phase shift unit.

As shown in FIGS. 1-3, a broadband dual circularly polarized millimeter-wave dual circularly polarized lens antenna of the present invention is disclosed, the antenna comprising one broadband circularly polarized planar feed source array 1 and one dual circularly polarized planar lens 2; the broadband circularly polarized planar feed source array 1 is located near the focal plane of the dual circularly polarized planar lens 2; the broadband circularly polarized planar feed source array 1 is composed of four slot-coupling circularly polarized antenna units 1*a* which are rotatably arranged in sequence and one microstrip parallel feed circuit 1*b*, and each slot-coupling circularly polarized antenna unit 1*a* is composed of a circular metal patch with an angle of chamfer at the upper layer 1*c*, a circular metal patch with an angle of chamfer at the lower layer 1*d*, and one metal floor with an I-shaped coupling slot excavated 1*e*; the dual circularly polarized planar lens 2 is composed of dual circularly polarized transmissive phase shift units 3 arranged periodically, wherein each dual circularly polarized transmissive phase shift unit 3 comprises one stacked metal patch with a grooved upper layer 3*a*, one metal floor 3*c* excavated with two circular slots 3*b*, and a stacked metal patch with a grooved lower layer 3*d*, the stacked metal patch with a grooved upper layer 3*a* and the stacked metal patch with a grooved lower layer 3*d* being connected by two upper-layer microstrip lines 3*e* and two lower-layer microstrip lines 3*f* via two metal through-holes 3*g*; the phase shift of any one of the two upper layer microstrip lines 3*e* of each dual circularly polarized transmissive phase shift unit 3 is a quarter of the sum of the phase shifts of the left-handed circularly polarized wave and the right-handed circularly polarized wave required by the unit, and the phase shift of the other microstrip line is a quarter of the sum of phase shifts of the left-handed circularly polarized wave and the right-handed circularly polarized wave required by the unit plus or minus 90°; the in-plane rotation angle of each dual circularly polarized transmissive phase shift unit 3 is equal to a quarter of the difference between the phase shifts of the left-handed circularly polarized wave and the right-handed circularly polarized wave required by the unit.

Figure 11:
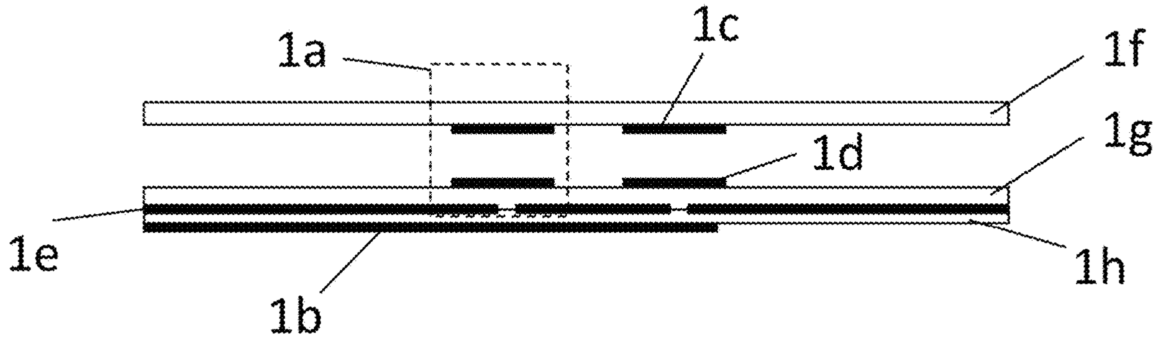
FIG. 11 is a sectional view of a structure of a broadband circularly polarized planar feed source array.

As shown in FIG. 11, the broadband circularly polarized planar feed source array 1 comprises a feed source upper layer substrate 1*f*, a feed source middle layer substrate 1*g*, and a feed source bottom layer substrate 1*h*, wherein the metal patch with an angle of chamfer at the upper layer 1*c* is attached on the lower surface of the feed source upper layer substrate 1*f*, the metal patch with an angle of chamfer at the lower layer 1*d* is attached on the upper surface of the feed source middle layer substrate 1*g*, the microstrip parallel feed circuit 1*b* is attached on the lower surface of the feed source bottom layer substrate 1*h*, and a first metal floor 1*e* is located between the feed source middle layer substrate 1*g* and the feed source bottom layer substrate 1*h*. Between the feed source upper layer substrate 1*f* and the feed source middle layer substrate 1*g* is one air layer for controlling the coupling strength between the circular metal patch with an angle of chamfer at the upper layer 1*c* and the circular metal patch with an angle of chamfer at the lower layer 1*d*, and the thickness is less than 0.15 wavelength.

Figure 12:
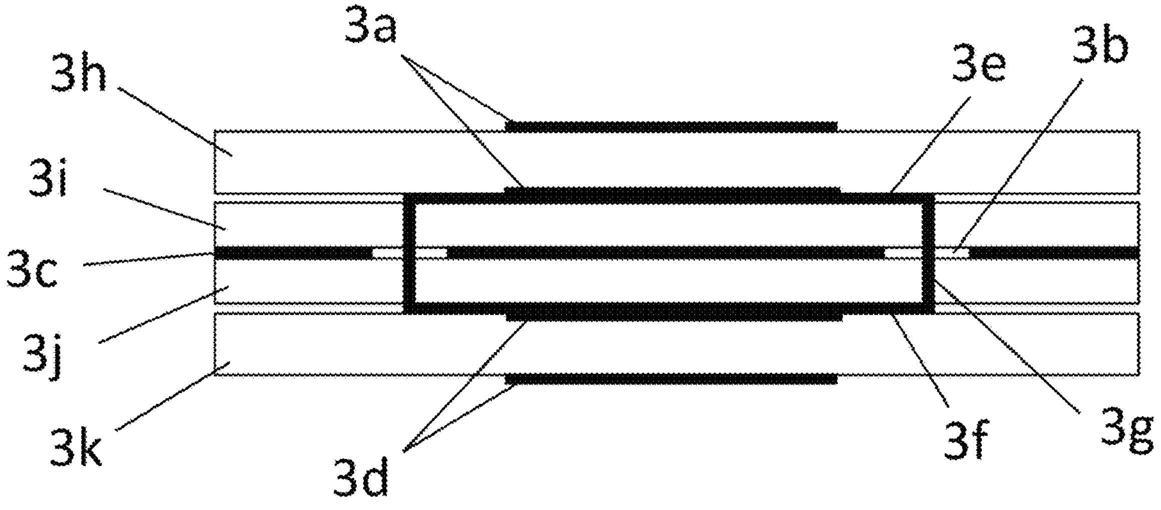
FIG. 12 is a sectional view of a structure of a dual circularly polarized planar lens.

As shown in FIG. 12, the dual circularly polarized planar lens 2 includes a lens first layer substrate 3*h*, a lens second layer substrate 3*i*, a lens third layer substrate 3*j*, and a lens fourth layer substrate 3*k*. The dual circularly polarized transmissive phase shift unit 3 comprises: a stacked metal patch with a grooved upper layer 3*a* and a stacked metal patch with a grooved lower layer 3*d* which are both of a double-layer metal layer structure, and a metal floor 3*c* which is of a single-layer metal layer structure, wherein the lower layer of the stacked patch 3*a* and the two upper-layer microstrip lines 3*e* are in the same metal layer and are physically connected; the upper layer of the stacked metal patch with a grooved lower layer 3*d* and 3*f* are in the same metal layer and are physically connected. The stacked metal patch with a grooved upper layer 3*a* is attached to the upper surface and lower surface of the first-layer substrate of the lens 3*h*, the stacked metal patch with a grooved lower layer 3*d* is attached to the upper surface and lower surface of the fourth-layer substrate of the lens 3*k*, the metal floor 3*c* is located between the second-layer substrate of the lens 3*i* and the third-layer substrate of the lens 3*j*, and the metal through-holes 3*g* are located at two sides of the circular slot 3*b*, and the two are concentric.

In the present invention, the broadband circularly polarized planar feed source array can radiate left-handed/right-handed circularly polarized waves in a very wide frequency band, the center of the broadband circularly polarized planar feed source array and the center of the dual circularly polarized planar lens are on the same line, the distance therebetween is F, the diameter of the planar reflective array is D, and the value of F/D should be between 0.3 and 1.5, which is set as 0.85.

The broadband circularly polarized planar feed source array is composed of four slot-coupling circularly polarized antenna units which are arranged to rotate in sequence and one microstrip parallel feed circuit, and each slot-coupling circularly polarized antenna unit is composed of a circular metal patch with an angle of chamfer at the upper layer, a circular metal patch with an angle of chamfer at the lower layer, and one metal floor with an I-shaped coupling slot excavated. Between the feed source upper layer substrate and the feed source middle layer substrate is one air layer for controlling the coupling strength between the circular metal patch with an angle of chamfer at the upper layer and the circular metal patch with an angle of chamfer at the lower layer. By controlling the size of the angle of chamfer portions of the upper layer and lower layer circular patches and the thickness of the air layer, the axial ratio of the wave radiated by the antenna unit can be adjusted in a wide frequency band range, so as to achieve broadband circularly polarized radiation; by controlling the positions of the angle of chamfer portions of the upper layer and lower layer circular patches at −45° or +45°, the left-handed or right-handed circularly polarized radiation can be achieved. By optimizing the size of the I-shaped coupling slot and its relative position to the patch, a good impedance match can be obtained, resulting in a reflection coefficient of less than −15 dB over a wide frequency band range. However, due to the low gain of a single unit and the too wide beamwidth (about 90°), using it to stimulate the lens will result in large edge overflow losses. Therefore, in order to form a narrow wave beam and further expand the bandwidth, four slots are used to couple the circularly polarized antenna units, which are arranged to rotate in sequence, and the rotation angles thereof are successively 0°, 90°, 0°, and 90°, and the four circularly polarized antenna units are fed by one microstrip parallel feed circuit. The characteristic impedance of the input port of the microstrip parallel feed circuit is 50 ohms, the characteristic impedance of the four output ports is 70 ohms, and the output phases of the four output ports are successively 0°, 90°, 180°, 270° or 0°, −90°, −180°, −270° according to the radiation required to be achieved being left-handed or right-handed circularly polarized waves. The achieved four-unit broadband circularly polarized planar feed source array can have a circularly polarized wave beam with a high degree of symmetry, high polarization purity, and stable gain, and its 2 dB axial ratio bandwidth and 1 dB gain bandwidth both exceed 25%.

As shown in FIG. 3, the dual circularly polarized planar lens is composed of dual circularly polarized transmissive phase shift units which are arranged periodically, where the unit period is chosen to be ½ wavelength. Each unit is a transmissive half wave plate, so that the transmissive wave of the incident left-handed/right-handed circularly polarized waves becomes the right-handed/left-handed circularly polarized wave, and the reflection phases ($\phi_{RL}$ and $\phi_{LR}$) of the left-handed circularly polarized wave and the right-handed circularly polarized wave can be independently controlled, so as to achieve independent beam forming of the left-handed/right-handed circularly polarized wave. The dual circularly polarized transmissive phase shift unit comprises one stacked metal patch with a grooved upper layer, one metal floor with two circular slots excavated, and a stacked metal patch with a grooved lower layer. The stacked metal patch with a grooved upper layer and the stacked metal patch with a grooved lower layer are connected by two upper-layer microstrip lines and two lower-layer microstrip lines via two metal through-holes. There is one dielectric layer between each two of the five layers of metal layers, and therefore, there are a total of four layers of dielectric substrates. The dielectric layer generally uses a mixed-pressure high-frequency circuit board, FR4, etc. to separate and support the metal layer, and the metal layer can use materials such as copper or gold, etc. The use of stacked patches can effectively increase the bandwidth, while the stacked metal patch with a grooved upper layer and the stacked metal patch with a grooved lower layer of the dual circularly polarized transmissive phase shift unit contain four rectangular grooves in the ±45° direction to reduce the coupling between the units. The stacked metal patch with a grooved upper layer of each unit receives the circularly polarized wave of the broadband circularly polarized planar feed source array, and converts two orthogonal linearly polarized components of the incident wave respectively into guided waves in the two upper-layer microstrip lines connected to the patch in the x and y directions. These two guided waves are then transmitted to the two lower-layer microstrip lines on the fourth-layer metal through the metal through-hole on the metal floor, and are radiated via the stacked metal patch with a grooved lower layer, thereby forming a transmissive wave. Due to the different lengths of the transmission lines, the transmissive phases of the two orthogonal linear polarizations are different, where the total length difference of the two microstrip transmission lines connected to the patch in the x and y directions is one-half wavelength. So that the transmissive phases of the two orthogonal linearly polarized components differ by 180 degrees, so the transmissive wave changes from left-handed/right-handed circular polarization to right-handed/left-handed circular polarization. By controlling the lengths of the microstrip transmission lines of different units, and the rotation angles of all the structures in the units, the reflection phases of the left-handed and right-handed circularly polarized waves can be independently controlled, and the phase shift of 360 degrees can be achieved, thereby satisfying the requirement of forming almost any wave beam. Specifically, three conditions need to be met: 1) the phase shift of any one of the two upper-layer microstrip lines of the dual circularly polarized transmissive phase shift unit is a quarter of the sum of the phase shifts of the left-handed circularly polarized wave and the right-handed circularly polarized wave required by the unit, 2) the phase shift of the other microstrip line is a quarter of the sum of phase shifts of the left-handed circularly polarized wave and the right-handed circularly polarized wave required by the unit plus or minus 90°; and 3) the in-plane rotation angle of the dual circularly polarized transmissive phase shift unit is equal to a quarter of the difference between the phase shifts of the left-handed circularly polarized wave and the right-handed circularly polarized wave required by the unit.

Figure 4A:
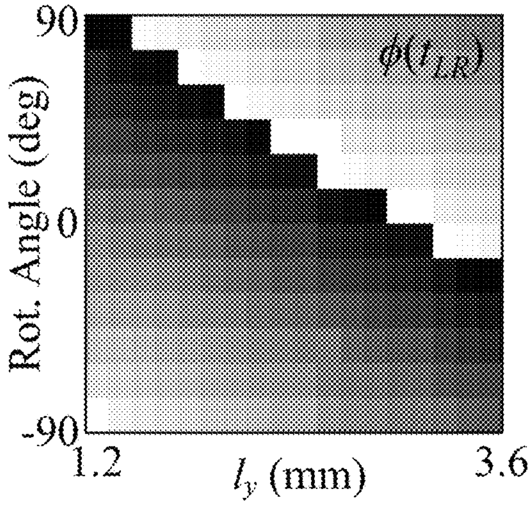
FIG. 4A and FIG. 4B show distribution diagrams of the change of the left-handed/right-handed circularly polarized wave transmissive phase shift at 21 GHz of the dual circularly polarized transmissive phase shift unit of the broadband dual circularly polarized millimeter-wave dual circularly polarized lens antenna as a function of the microstrip line length ($l_y$) and unit rotation angle.
Figure 4B:
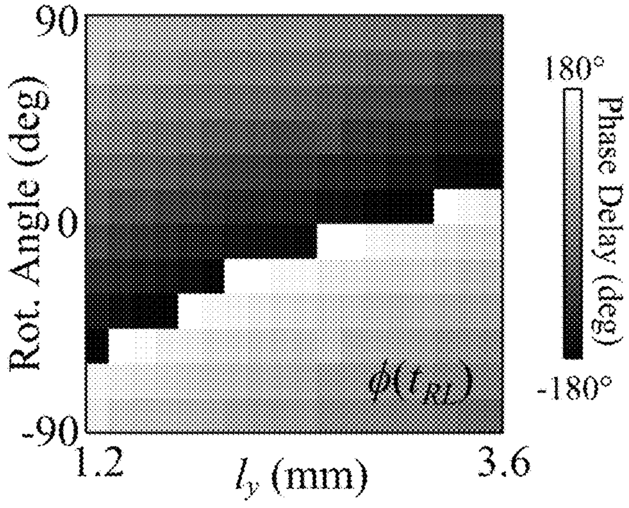
Figure 5A:
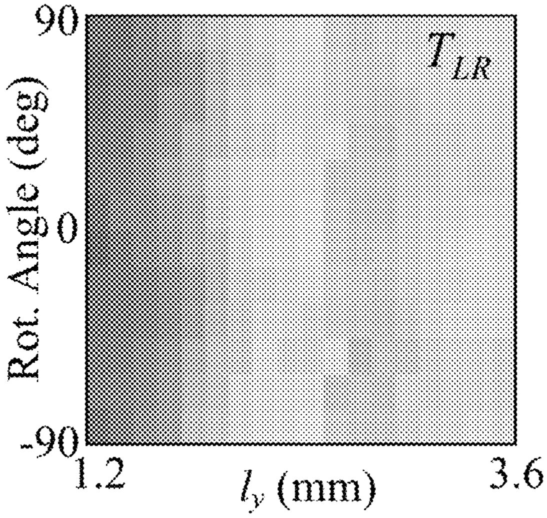
FIG. 5A and FIG. 5B show distribution diagrams of the change of the left-handed/right-handed circularly polarized wave transmission amplitude at 21 GHz of the dual circularly polarized transmissive phase shift unit of the broadband dual circularly polarized millimeter-wave dual circularly polarized lens antenna as a function of the microstrip line length ($l_y$) and unit rotation angle.
Figure 5B:
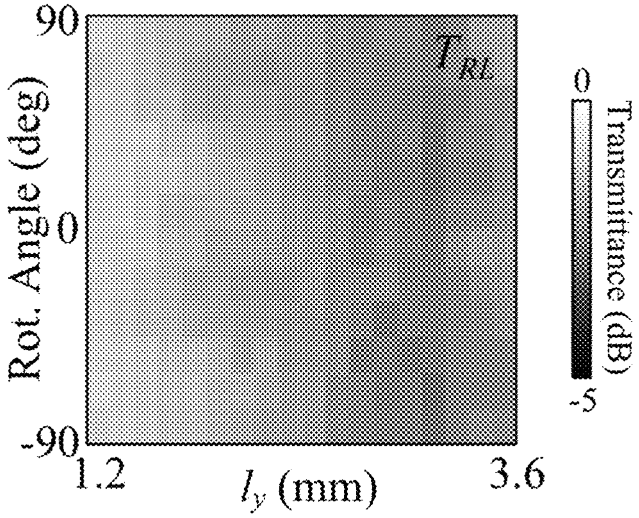
Figure 6A:
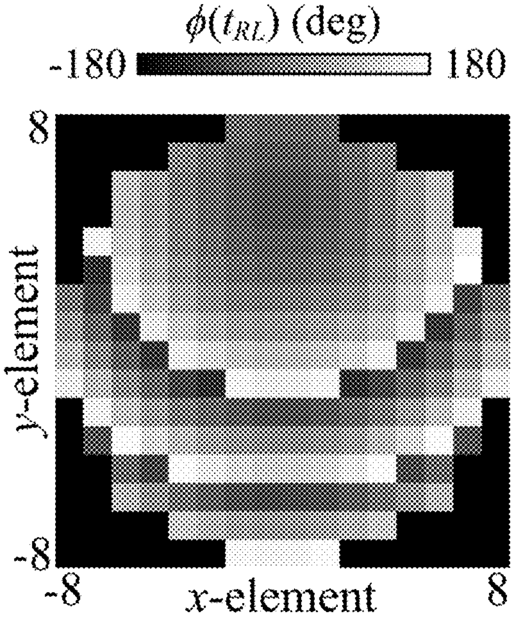
FIG. 6A, FIG. 6B, FIG. 6C and FIG. 6D show circularly polarized transmissive phase distributions of the left-handed rotation to right-handed rotation and right-handed rotation to the left-handed rotation of a unit on a dual circularly polarized planar lens of the broadband dual circularly polarized millimeter-wave dual circularly polarized lens antenna and the corresponding distribution diagrams of the microstrip line length ($l_y$) of the dual circularly polarized transmissive phase shift unit and the rotation angle of the dual circularly polarized transmissive phase shift unit.
Figure 6B:
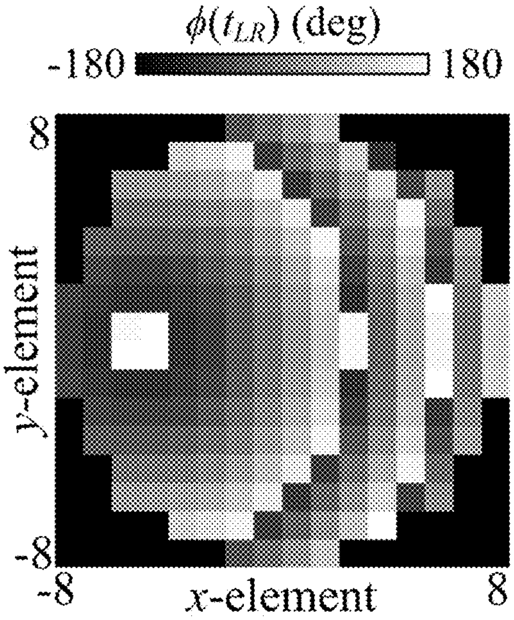
Figure 6C:
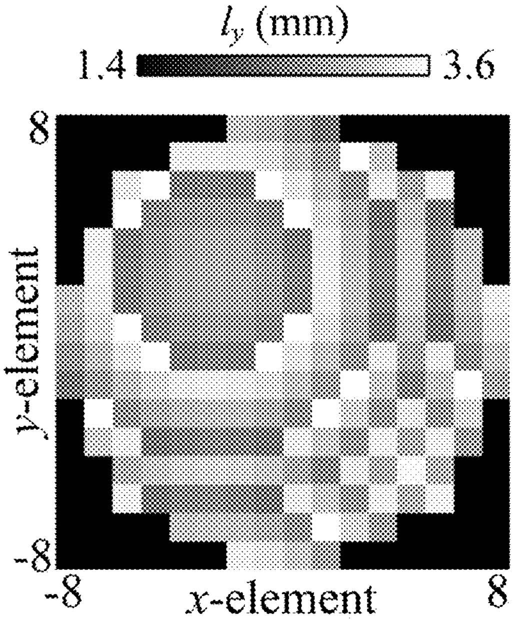
Figure 6D:
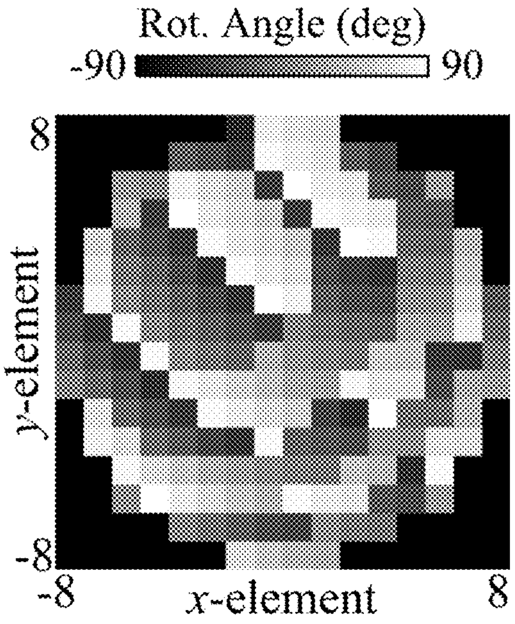

FIG. 4A and FIG. 4B show distribution diagrams of the change of the left-handed/right-handed circularly polarized wave transmissive phase shift of the dual circularly polarized transmissive phase shift unit of the broadband dual circularly polarized millimeter-wave dual circularly polarized lens antenna as a function of the microstrip line length ($l_y$) and unit rotation angle. It can be seen that by changing the length of the microstrip line and the rotation angle of the unit at the same time, independent phase shifts of the left-handed and right-handed circularly polarized waves can be achieved, and both can cover a phase shift range of 360°. FIG. 5A and FIG. 5B show distribution diagrams of the change of the left-handed/right-handed circularly polarized wave transmission amplitude of the dual circularly polarized transmissive phase shift unit of the broadband dual circularly polarized millimeter-wave dual circularly polarized lens antenna as a function of the microstrip line length ($l_y$) and unit rotation angle. It can be seen that while changing the length of the microstrip line and the rotation angle of the unit, both of the transmission amplitudes of the left-handed and right-handed circularly polarized waves remain above −2 dB, thereby ensuring a relatively smooth and steady, and high transmissivity.

FIG. 6A, FIG. 6B, FIG. 6C and FIG. 6D circularly polarized transmissive phase distributions of the left-handed rotation to right-handed rotation and right-handed rotation to the left-handed rotation of a unit on a dual circularly polarized planar lens of the broadband dual circularly polarized millimeter-wave dual circularly polarized lens antenna and the corresponding distribution diagrams of the microstrip line length ($l_y$) of the dual circularly polarized transmissive phase shift unit and the rotation angle of the dual circularly polarized transmissive phase shift unit. This distribution can correspondingly achieve left-handed rotation beam pointing ($\theta_L$, $\varphi_L$)=(20°, 90°) and right-handed rotation beam pointing ($\theta_R$, $\varphi_R$)=(20°, 180°).

Figure 7A:
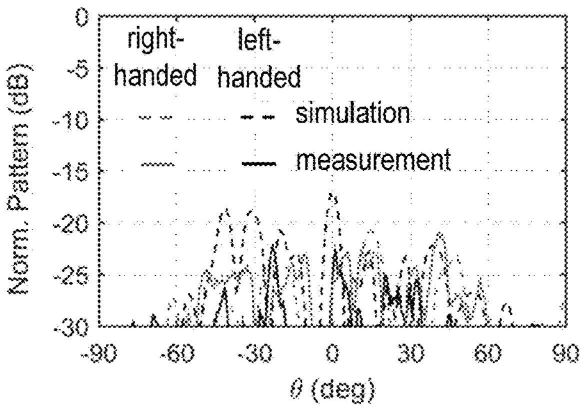
FIG. 7A and FIG. 7B show the simulated and measured normalized directional diagrams of left-handed circularly polarized and right-handed circularly polarized at 21 GHz for the broadband dual circularly polarized millimeter-wave dual circularly polarized lens antenna stimulated by a left-handed broadband circularly polarized planar feed source array.
Figure 7B:
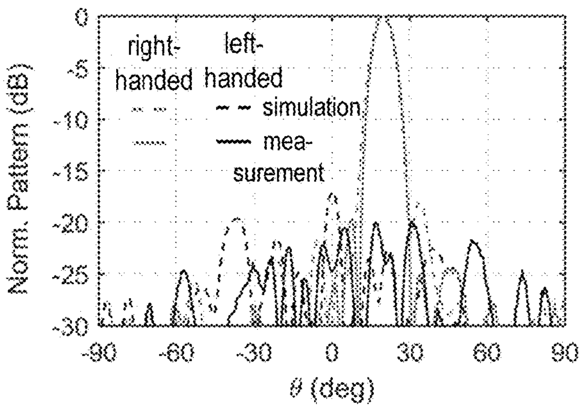

FIG. 7A and FIG. 7B show the simulated and measured normalized directional diagrams of left-handed circularly polarized and right-handed circularly polarized in the plane x-z and the plane y-z at 21 GHz for the broadband dual circularly polarized millimeter-wave dual circularly polarized lens antenna stimulated by a left-handed broadband circularly polarized planar feed source array. It can be seen that one right-handed circularly polarized high-gain wave beam is generated in the direction of +20° in the plane y-z, and the measuring result is in good agreement with the simulation result.

Figure 8A:
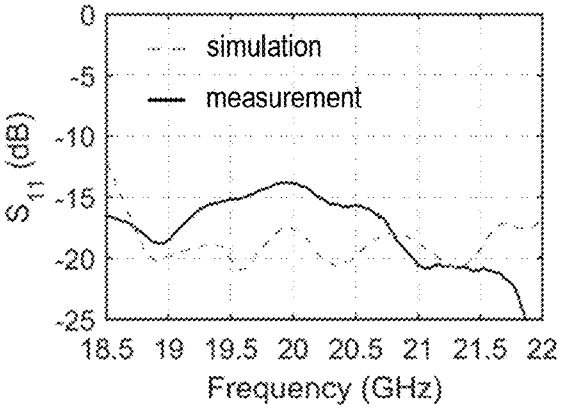
FIG. 8A and FIG. 8B show shows the changing curve of the simulated and measured port reflection coefficient, gain, and axial ratio along with the frequency for the broadband dual circularly polarized millimeter-wave dual circularly polarized lens antenna stimulated by the left-handed broadband circularly polarized planar feed source array at 21 GHz.
Figure 8B:
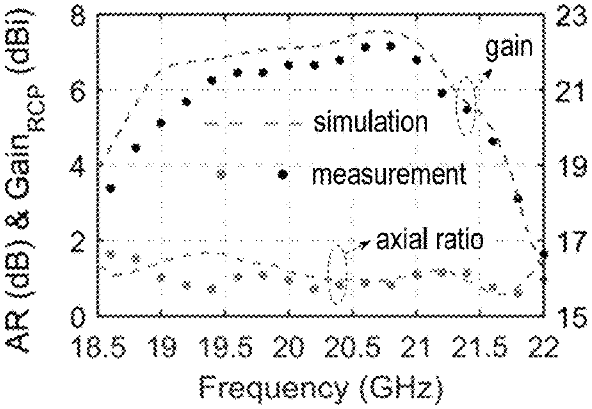

FIG. 8A and FIG. 8B show shows the changing curve of the simulated and measured port reflection coefficient, axial ratio, and right-handed circularly polarized gain along with the frequency for the broadband dual circularly polarized millimeter-wave dual circularly polarized lens antenna stimulated by the left-handed broadband circularly polarized planar feed source array at 21 GHz. It can be seen that the measured and simulated results are consistent. Throughout the frequency band, the reflection coefficient is less than −14 dB, the maximum gain is about 22.3 dBic, and the 1 dB gain bandwidth and the 2 dB axial ratio bandwidth is about 12.4%.

Figure 9A:
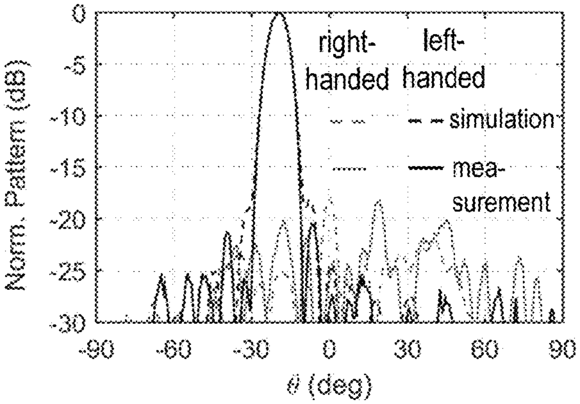
FIG. 9A and FIG. 9B show the simulated and measured normalized directional diagrams of left-handed circularly polarized and right-handed circularly polarized at 21 GHz for the broadband dual circularly polarized millimeter-wave dual circularly polarized lens antenna stimulated by a right-handed broadband circularly polarized planar feed source array.
Figure 9B:
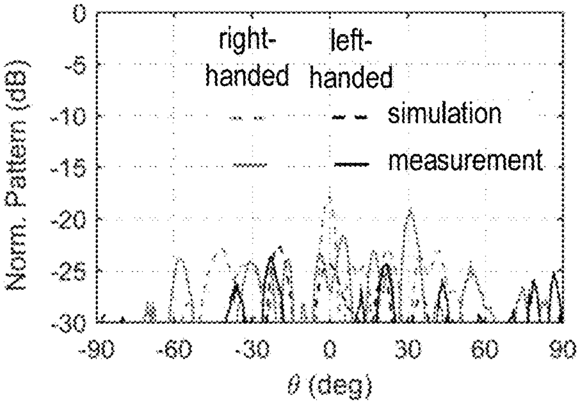

FIG. 9A and FIG. 9B show the simulated and measured normalized directional diagrams of left-handed circularly polarized and right-handed circularly polarized in the plane x-z and the plane y-z at 21 GHz for the broadband dual circularly polarized millimeter-wave dual circularly polarized lens antenna stimulated by a right-handed broadband circularly polarized planar feed source array. It can be seen that one left-handed circularly polarized high-gain wave beam is generated in the direction of −20° in the plane x-z, and the measuring result is in good agreement with the simulation result.

Figure 10A:
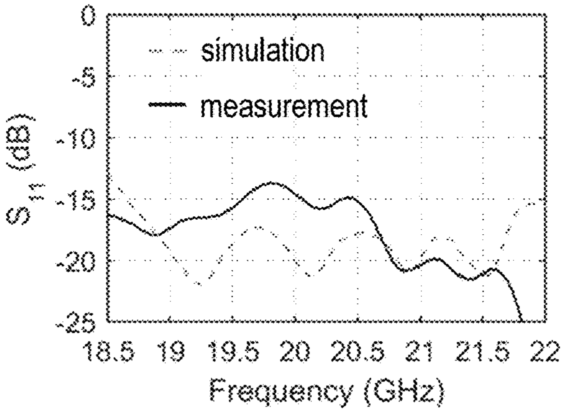
FIG. 10A and FIG. 10B show the changing curve of the simulated and measured gain and axial ratio along with the frequency for the broadband dual circularly polarized millimeter-wave dual circularly polarized lens antenna stimulated by the right-handed broadband circularly polarized planar feed source array at 21 GHz.
Figure 10B:
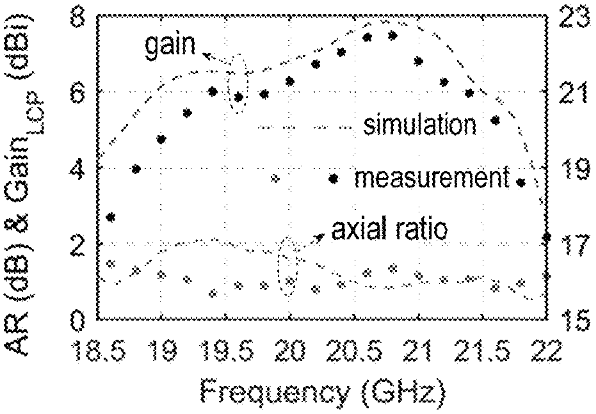

FIG. 10A and FIG. 10B show the changing curve of the simulated and measured port reflection coefficient, axial ratio, and left-handed circularly polarized gain along with the frequency for the broadband dual circularly polarized millimeter-wave dual circularly polarized lens antenna stimulated by the right-handed circular broadband circularly polarized planar feed source array at 21 GHz. It can be seen that the measured and simulated results are consistent. Throughout the frequency band, the reflection coefficient is less than −14 dB, the maximum gain is about 22.5 dBic, and the 1 dB gain bandwidth and the 2 dB axial ratio bandwidth is about 12.2%.

The foregoing are only preferred implementation modes of the present invention. It should be noted that: it will be apparent to those of ordinary skills in the art that several improvements and modifications can be further made without departing from the principle of the present invention, and such improvements and modifications should also be considered falling into the scope of the present invention.

What is claimed is:

1. A millimeter-wave dual circularly polarized lens antenna, comprising a broadband circularly polarized planar feed source array and a dual circularly polarized planar lens arranged in parallel, wherein the broadband circularly polarized planar feed source array outputs or receives a signal through the dual circularly polarized planar lens, wherein the dual circularly polarized planar lens comprises a plurality of dual circularly polarized transmissive phase shift units arranged periodically, wherein each dual circularly polarized transmissive phase shift unit comprises a stacked metal patch with a grooved upper layer, a second metal floor provided with two circular slots, a stacked metal patch with a grooved lower layer, and two upper-layer microstrip lines and two lower-layer microstrip lines;

the stacked metal patch with the grooved upper layer faces the broadband circularly polarized planar feed source array, both the stacked metal patch with the grooved upper layer and the stacked metal patch with the grooved lower layer are of a double-layer metal patch stacked structure, and a lower layer of the stacked metal patch with the grooved upper layer and the two upper-layer microstrip lines are in a same metal layer and are physically connected; an upper layer of the stacked metal patch with the grooved lower layer and two lower-layer microstrip lines are in the same metal layer and are physically connected;

outer ends of each of the upper-layer microstrip line and the lower-layer microstrip line are provided with metal through-holes which are connected to each other and pass through the circular slot; the stacked metal patch with the grooved upper layer and the stacked metal patch with the grooved lower layer are connected by the two upper-layer microstrip lines, the two lower-layer microstrip lines, and the two metal through-holes.

2. The millimeter-wave dual circularly polarized lens antenna according to claim 1, wherein each of the dual circularly polarized transmissive phase shift unit is a transmissive half wave plate, and one dielectric layer is provided between layers of the stacked metal patch with the grooved upper layer, the second metal floor, and the stacked metal patch with the grooved lower layer;

the stacked metal patch with the grooved upper layer and the stacked metal patch with the grooved lower layer are respectively provided with four rectangular grooves opening outwards a direction of ±45°.

3. An electronic equipment, comprising a housing, wherein more than one millimeter-wave dual circularly polarized lens antenna as claimed in claim 2 is provided in the housing.

4. The millimeter-wave dual circularly polarized lens antenna according to claim 1, wherein a phase shift of any one of the two upper-layer microstrip lines of the dual circularly polarized transmissive phase shift unit is a quarter of a sum of the phase shifts of the left-handed circularly polarized wave and the right-handed circularly polarized wave required by a unit, and the phase shift of the other microstrip line is a quarter of the sum of phase shifts of the left-handed circularly polarized wave and the right-handed circularly polarized wave required by the unit plus or minus 90°, and an in-plane rotation angle of the dual circularly polarized transmissive phase shift unit is equal to a quarter of a difference between the phase shifts of the left-handed circularly polarized wave and the right-handed circularly polarized wave required by the unit; it is used to achieve independently controllable dual circularly polarized millimeter-wave beam.

5. An electronic equipment, comprising a housing, wherein more than one millimeter-wave dual circularly polarized lens antenna as claimed in claim 4 is provided in the housing.

6. The millimeter-wave dual circularly polarized lens antenna according to claim 1, wherein the in-plane rotation angle of each dual circularly polarized transmissive phase shift unit is 0°, the phase shifts of the two upper-layer microstrip lines of the dual circularly polarized transmissive phase shift unit are respectively one-half of the phase shifts of two linear polarizations required by the unit, and patterns and sizes of the two upper-layer microstrip lines and the two lower-layer microstrip lines are identical; it is used to achieve independently controllable dual linearly polarized wave beam.

7. An electronic equipment, comprising a housing, wherein more than one millimeter-wave dual circularly polarized lens antenna as claimed in claim 6 is provided in the housing.

8. The millimeter-wave dual circularly polarized lens antenna according to claim 1, wherein the broadband circularly polarized planar feed source array comprises a plurality of feed source antenna units, wherein each feed source antenna unit comprises four slot-coupling circularly polarized antenna units which are arranged to rotate in sequence and one microstrip parallel feed circuit, and each of the slot-coupling circularly polarized antenna unit comprises a metal patch with an angle of chamfer at the upper layer, a metal patch with an angle of chamfer at the lower layer, and a first metal floor, an I-shaped coupling slot being provided on the first metal floor.

9. The millimeter-wave dual circularly polarized lens antenna according to claim 8, wherein angles of chamfer of the circular metal patch with an angle of chamfer at the upper layer and the circular metal patch with an angle of chamfer at the lower layer are −45° or +45°; the four slot-coupling circularly polarized antenna units are arranged to rotate in sequence, with rotation angles successively being 0°, 90°, 0°, and 90°;

the microstrip parallel feed circuit feeds four circularly polarized antenna units, and the microstrip parallel feed circuit comprises one input port and four output ports, wherein a characteristic impedance of the input port is 50 ohms, the characteristic impedance of the four output ports is 70 ohms, and output phases are successively 0°, 90°, 180°, 270° or 0°, −90°, −180°, −270°.

10. An electronic equipment, comprising a housing, wherein more than one millimeter-wave dual circularly polarized lens antenna as claimed in claim 9 is provided in the housing.

11. The millimeter-wave planar lens antenna according to claim 8, wherein the broadband circularly polarized planar feed source array comprises a feed source upper layer substrate, a feed source middle layer substrate, and a feed source bottom layer substrate, wherein the metal patch with an angle of chamfer at the upper layer is attached on a lower surface of the feed source upper layer substrate, the metal patch with an angle of chamfer at the lower layer is attached on an upper surface of the feed source middle layer substrate, the microstrip parallel feed circuit is attached on the lower surface of the feed source bottom layer substrate, and the first metal floor is located between the feed source middle layer substrate and the feed source bottom layer substrate; between the feed source upper layer substrate and the feed source middle layer substrate is one air layer for controlling a coupling strength between the circular metal patch with an angle of chamfer at the upper layer and the circular metal patch with an angle of chamfer at the lower layer, and a thickness is less than 0.15 wavelength.

12. An electronic equipment, comprising a housing, wherein more than one millimeter-wave dual circularly polarized lens antenna as claimed in claim 11 is provided in the housing.

13. An electronic equipment, comprising a housing, wherein more than one millimeter-wave dual circularly polarized lens antenna as claimed in claim 8 is provided in the housing.

14. The millimeter-wave planar lens antenna according to claim 1, wherein the dual circularly polarized planar lens comprises a lens first-layer substrate, a lens second-layer substrate, a lens third-layer substrate, and a lens fourth-layer substrate; two layers of the stacked metal patch with the grooved upper layer are respectively attached to an upper surface and a lower surface of the lens first-layer substrate, the two layers of the stacked metal patch with the grooved lower layer are respectively attached to the upper surface and lower surface of the lens fourth-layer substrate, and the second metal floor is located between the lens second-layer substrate and the lens third-layer substrate.

15. An electronic equipment, comprising a housing, wherein more than one millimeter-wave dual circularly polarized lens antenna as claimed in claim 14 is provided in the housing.

16. The millimeter-wave dual circularly polarized lens antenna according to claim 1, wherein a center of the broadband circularly polarized planar feed source array and the center of the dual circularly polarized planar lens are on the same line, a distance between the two is F, a diameter of the dual circularly polarized planar lens is D, and a value range of F/D is 0.3-1.5.

17. An electronic equipment, comprising a housing, wherein more than one millimeter-wave dual circularly polarized lens antenna as claimed in claim 16 is provided in the housing.

18. An electronic equipment, comprising a housing, wherein more than one millimeter-wave dual circularly polarized lens antenna as claimed in claim 1 is provided in the housing.

* * * * *